(12) United States Patent
Sun et al.

(10) Patent No.: US 10,909,072 B2
(45) Date of Patent: Feb. 2, 2021

(54) KEY VALUE STORE SNAPSHOT IN A DISTRIBUTED MEMORY OBJECT ARCHITECTURE

(71) Applicant: MemVerge, Inc, San Jose, CA (US)

(72) Inventors: Jiajie Sun, Shanghai (CN); Robert W Beauchamp, Berlin, MA (US); Yue Li, Fremont, CA (US); Jie Yu, Shanghai (CN)

(73) Assignee: MemVerge, Inc., Milpitas, CA (US)

( * ) Notice: Subject to any disclaimer, the term of this patent is extended or adjusted under 35 U.S.C. 154(b) by 92 days.

(21) Appl. No.: 16/372,283

(22) Filed: Apr. 1, 2019

(65) Prior Publication Data

US 2020/0042496 A1    Feb. 6, 2020

Related U.S. Application Data

(63) Continuation-in-part of application No. 16/255,414, filed on Jan. 23, 2019.

(Continued)

(51) Int. Cl.
*G06F 3/06* (2006.01)
*G06F 16/11* (2019.01)
(Continued)

(52) U.S. Cl.
CPC ............ *G06F 16/128* (2019.01); *G06F 3/067* (2013.01); *G06F 3/0611* (2013.01);
(Continued)

(58) Field of Classification Search
CPC ........ G06F 16/128; G06F 16/137; G06F 3/06; G06F 3/0611; G06F 3/065; G06F 3/0619;
(Continued)

(56) References Cited

U.S. PATENT DOCUMENTS 5,787,247 A * 7/1998 Norin ................ G06F 15/17381
709/220
2006/0106832 A1 * 5/2006 Ben-Dyke ............. G06F 16/284
(Continued)

*Primary Examiner* — Mamo Padmanabhan
*Assistant Examiner* — Jean C Edouard

(57) ABSTRACT

Disclosed herein is an apparatus and method for a key value store snapshot for a distributed memory object system. In one embodiment, a method includes forming a system cluster comprising a plurality of nodes, wherein each node includes a memory, a processor and a network interface to send and receive messages and data; creating a plurality of sharable memory spaces having partitioned data, wherein each space is a distributed memory object having a compute node, wherein the sharable memory spaces are at least one of persistent memory or DRAM cache; storing data in persistent memory, the data having a generation tag created from a generation counter and a doubly linked list having a current view and a snapshot view, the data further being stored in either a root or a persisted row; creating a snapshot comprising a consistent point-in-time view of key value contents within a node and incrementing the generation counter; copying the snapshot to a second node; regenerating an index for the key value contents within the node; and logging updates since the snap was applied to update copied data in the second node.

12 Claims, 10 Drawing Sheets

Related U.S. Application Data

(60) Provisional application No. 62/713,537, filed on Aug. 2, 2018.

(51) Int. Cl.
*G06F 16/13* (2019.01)
*G06F 12/084* (2016.01)
*G06F 9/50* (2006.01)

(52) U.S. Cl.
CPC .......... *G06F 3/0643* (2013.01); *G06F 9/5016* (2013.01); *G06F 9/5077* (2013.01); *G06F 12/084* (2013.01); *G06F 16/137* (2019.01)

(58) Field of Classification Search
CPC ...... G06F 3/0643; G06F 3/067; G06F 9/5016; G06F 9/5077; G06F 12/084; G06F 12/14
USPC .................................................. 711/114, 162
See application file for complete search history.

(56) References Cited

U.S. PATENT DOCUMENTS

| | | | |
|---|---|---|---|
| 2013/0218840 A1* | 8/2013 | Smith | G06F 11/1662 707/639 |
| 2016/0004480 A1* | 1/2016 | Lakshman | G06F 3/0607 711/114 |
| 2017/0003899 A1* | 1/2017 | Raja | G06F 3/065 |
| 2017/0220777 A1* | 8/2017 | Wang | G06F 21/105 |

* cited by examiner

KEY VALUE STORE SNAPSHOT IN A DISTRIBUTED MEMORY OBJECT ARCHITECTURE

CROSS-REFERENCE TO RELATED APPLICATION(S)

This application claims the benefit of and priority to U.S. Provisional Patent Application Ser. No. 62/713,537, filed on Aug. 2, 2018 for "Distributed Memory Object Architecture that Enables Memory-Speed Data Access for both Memory Semantics and Storage Semantics in a Distributed Environment", and 2) U.S. Non-provisional patent application Ser. No. 16/255,414, filed on Jan. 23, 2019 for "A Distributed Memory Object Architecture", the entire disclosure of which are incorporated herein by references.

TECHNICAL FIELD

The present disclosure relates generally to distributed computing environments, and more particularly, to a key value store snapshot in a distributed memory object architecture.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (PMEM) technology has created mechanisms for a user-space application to have direct access (DAX) to persistent memory media (i.e., without the access being performed by operating system software). Examples of existing solutions include:

"NOVA", which is a single-node file system for persistent memory with emphasis on consistency. It uses per-file metadata journals for fast, concurrent, consistent updates. NOVA also supports DAX memory mapped access. It, however, does not provide cross-node replication or availability.

"Strata", which is a single-node file system that provides a tiered, log-structured file system starting from a persistent memory layer and progressing to SSD then HDD as the data access frequency cools. It, however, does not support DAX memory map access, nor provide cross-node replication or availability.

"Octopus", which is a multi-node distributed persistent memory file system using tightly integrated RDMA to reduce communication latency. It, however, does not support DAX memory mapped access.

"Hotpot", which is a multi-node kernel-level distributed shared persistent memory system that provides low latency, transparent memory accesses, data persistence, data reliability, and high availability. It is focused on memory mapped access and does not address standard file storage IO operations.

"FluidMem", which is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage. Disclosed herein in a distributed memory object (DMO) system, referred to as MemVerge DMO system, that provides these types of low-latency memory spaces.

SUMMARY

Disclosed herein is an apparatus and method for a key value store snapshot in a distributed memory object. In one embodiment, a method includes forming a system cluster comprising a plurality of nodes, wherein each node includes a memory, a processor and a network interface to send and receive messages and data; creating a plurality of sharable memory spaces having partitioned data, wherein each space is a distributed memory object having a compute node, wherein the sharable memory spaces are at least one of persistent memory or DRAM cache; storing data in persistent memory, the data having a generation tag created from a generation counter and a doubly linked list having a current view and a snapshot view, the data further being stored in either a root or a persisted row; creating a snapshot comprising a consistent point-in-time view of key value contents within a node and incrementing the generation counter; copying the snapshot to a second node; regenerating an index for the key value contents within the node; and logging updates since the snap was applied to update copied data in the second node.

In another embodiment, a key value store snapshot system for a distributed memory object comprises a system cluster comprising a plurality of nodes, wherein each node includes a memory, a processor and a network interface to send and receive messages and data, wherein the network interface operates on remote direct memory access; a plurality of sharable memory spaces having partitioned data, wherein each space is a distributed memory object having a compute node, wherein the sharable memory spaces are at least one of persistent memory or DRAM cache, wherein data is stored in persistent memory and the data has a generation tag created from a generation counter and a doubly linked list having a current view and a snapshot view, the data further being stored in either a root or a persisted row; and a snapshot comprising a consistent point-in-time view of key value contents within a node and incrementing the generation counter, wherein the snapshot is to be copied to a second node, and an index for the key value contents within the node is regenerated and updates are logged since the snap was applied to update copied data in the second node. Other embodiments are explained within this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (PMEM) refers to the storage of data structures such that the data can continue to be accessed using memory instructions, e.g., load and store, even after completion of the process that created or modified the data structures.

A MemVerge direct memory object (DMO) system provides persistent distributed memory objects that can be accessed as either in-memory or file-storage mode, and may be implemented in low-latency RDMA. Thus, the MemVerge DMO system enables use of DMOs both as memory and storage. The MemVerge DMO system also allows data in the system to be converted between in-memory and file-storage modes. In general, embodiment MemVerge DMO systems provide close-to-memory-speed data access which in turn can significantly relive data bottlenecks observed at upper layer applications. Furthermore, embodiments may be built in user space, thus obviating the need to install a customized operating system kernel. We now turn to FIG. 1 to discuss an embodiment DMO system in more detail.

Figure 1:
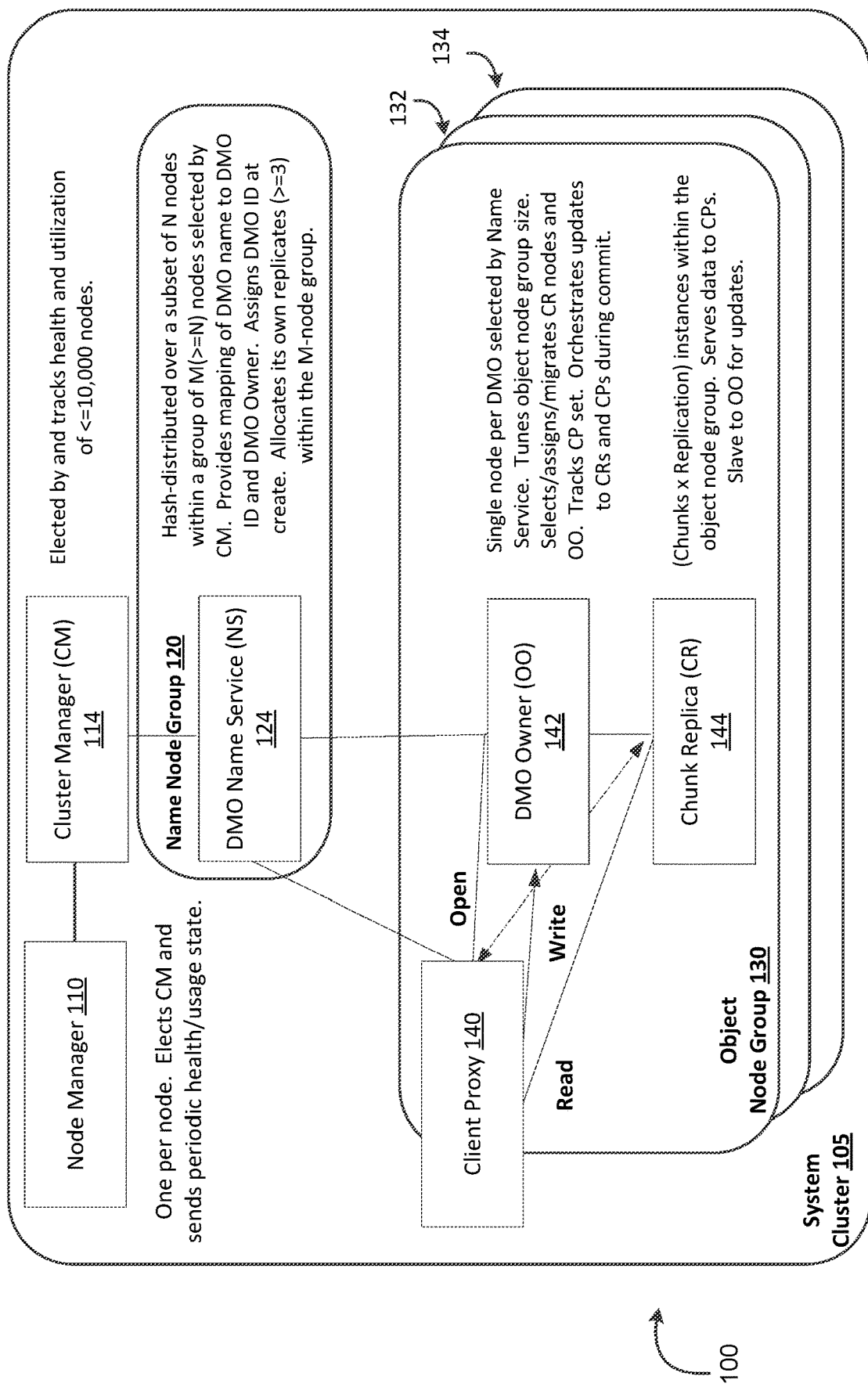
FIG. 1 is an illustration of a system cluster that includes an object node group that implements a distributed memory object (DMO) system, referred to herein a MemVerge DMO system, that provides persistent DMOs that can be accessed as either in-memory mode or file-storage mode.

FIG. 1 is an illustration of one embodiment of a MemVerge DMO system 100 that provides persistent distributed memory objects (DMOs) that can be accessed as either in-memory mode or file-storage mode. In DMO system 100, a system cluster 105 is formed by a number of nodes. Each node includes a memory, a processor and a network interface through which it may send and receive messages and data. The illustrated system 100 provides for the creation of sharable memory spaces, each space being a DMO with a single owner node such as object owner (OO) node 142. In this example a node that uses a DMO is referred to herein as a client proxy (CP) node. In the present embodiment, a system cluster 105 within which a MemVerge DMO system 100 may be implemented includes an object node group 130, a name node group 120, a node manager 110, and a cluster manager 114.

Address space for a DMO may be partitioned into equal size chunks, with each chunk being stored on one or more chunk replica (CR) nodes 144 included in the cluster of nodes 105. The chunks are distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 142 is responsible for coordinating updates to the client proxy nodes 140 as well as the chunk replica nodes 144. The object owner node 142 is also responsible for maintaining a configurable replication factor per DMO. The object owner node 142 and chunk replica nodes 144 can migrate to deal with failures, performance, or resource constraints. Client proxy nodes 140 and chunk replica nodes 144 cooperate with the object owner node 142 in implementing protocols to make coherent updates and thereby provide a crash consistent view in the face of failures.

Various functional components of a DMO system are associated with one or more nodes in the system cluster and are described in the follow paragraphs.

Node Manager (NM)

A node manager (NM) 110 operates on each node in a MemVerge DMO system 100. Once a node manager 110 starts on a node, it can start or stop all other services associated with a node. Some services associated with a node may be started or stopped automatically or by request. The node manager 110 is responsible for finding or electing the cluster manager (CM) 114 and notifying its existence and node health to the cluster manager 114. Hence the node manager 110 has access to performance and exception information from other components in the system 100.

Cluster Manager (CM)

The cluster manager 114 runs on a single node in the MemVerge DMO system 100. The single node on which the cluster manager runs is elected by a consensus algorithm of the node managers. The cluster manager mediates cluster membership, node ID assignment, and the name service (NS) group 120. The cluster manager 114 also chooses nodes to satisfy allocation request constraints against cluster resource loading.

DMO Name Service (NS)

The DMO name service (NS) 124 is a hash-distributed service which provides mapping of a DMO name string to its object ID and the object owner. The service is hash distributed across a set of nodes in the system cluster 105.

In the present example, the set of nodes is a name service group that is determined by the cluster manager.

Object Owner (OO)

The DMO object owner 142 is a single-node service that manages a DMO. The node corresponding to the client proxy 140 that creates the DMO becomes the object owner node 142. The object owner is responsible for selecting (via a cluster manager 114) an initial object node group 130 to contain the DMO and for assigning the chunk replicas (CRs) 144 within that node group. Some embodiments may contain additional object node groups 132, 134, etc. The object owner 142 also manages growing, shrinking, migrating, and recovering both the node group 130 as a whole, and the chunk replica 144 assignments within that group, as required to meet the DMO's size and replication requirement, or to optimize its usage efficiency. The object owner 142 can choose to move to another node (e.g., to be on the same node as a write client proxy). If the object owner 142 node fails, the DMO's node group will re-elect an object owner. The object owner keeps track of client proxies and orchestrates all updates affecting the DMO, e.g., configuration changes as well as data writes (msync commits and/or write TO).

Chunk Replica (CR)

The chunk replica 144 is a slave entity to the object owner 142 and client proxy 140. The object owner and client proxy read from and write to the chunk replica 144. The chunk replica owns some amount of storage devices (PMEM, SSD, etc.) on its node and manages the details of how/where a chunk of address space is stored therein.

Client Proxy (CP)

The client proxy 140 performs all input/output operations for the client and locally materializes and synchronizes/persists any object that the client requests to be memory mapped. To do that materialization, the client proxy creates a local cache for pieces of remote chunks that are in use and manages selection and eviction of pieces that are unused (or less actively used) as capacity constraints require. The client proxy 140 has code to specifically handle page fault notifications sent to it by the userfaultfd feature of Linux, or similar page fault notifications in other operating environments.

Example Operation Flows

Figure 2:
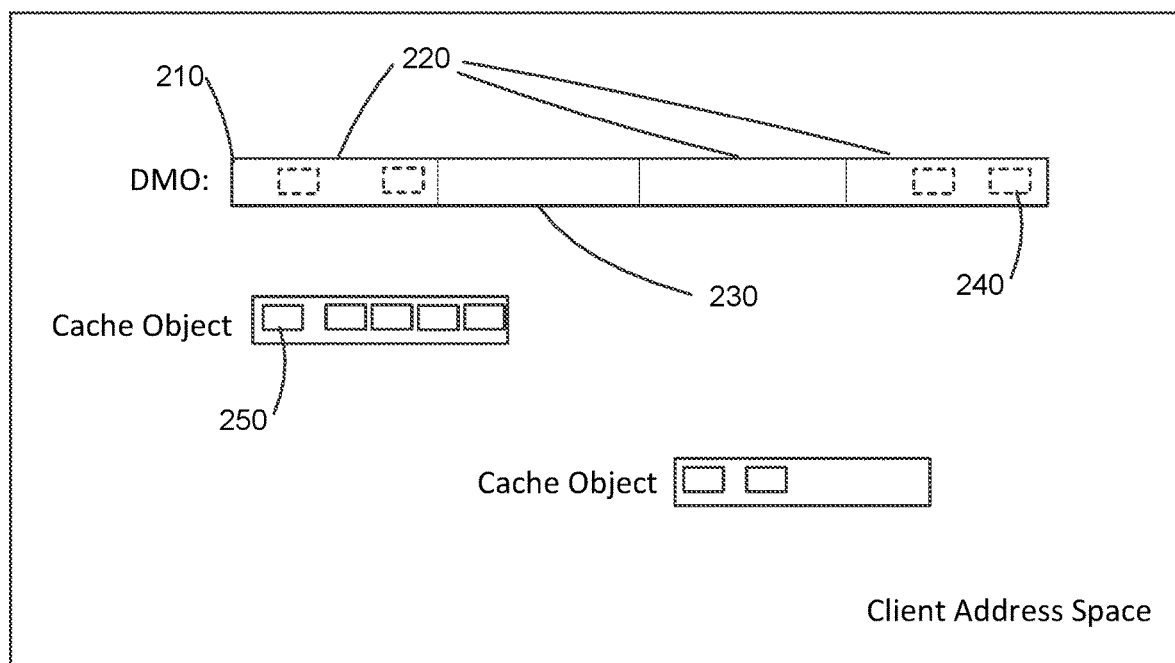
FIG. 2 is an illustration of a DMO in a client address space.

FIG. 2 is an illustration of a DMO in a client address space. When a client proxy opens a DMO, the client proxy allocates a logical address region 210 or space for that DMO and registers the region to monitor for page faults. The client proxy then direct maps for any local chunks 230 at their appropriate offset within the logical address region. Next, the client proxy acquires a remote direct memory access (RDMA) access descriptor to an instance of each remote chunk. The client proxy then creates and maps one or more persistent memory files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" MemVerge library that is included in the client application and may "call" a client proxy. The MemVerge library is configured to map an anonymous memory region equal to the size of the DMO, to register that memory region for user page faults, to over map 240 the local chunk files on that memory region, and to remember the cache file for later use. The client proxy is configured to call the DMO name service to get the object owner, call the object owner to get table of chunk nodes, to open "local chunk" files that are on the local node, to open an empty "cache file" or "cache object" on the local node, and to reply to MemVerge library in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO, i.e., it can do load/store references to the DMO, and/or read/write input/output calls to/from the DMO. If a load/store reference from the client application accesses a DMO region that is not over mapped, the client application takes/receives a page fault. The MemVerge library gets a page fault notification and calls to the client proxy. The client proxy caches the needed region into the cache file and replies to the MemVerge library. The MemVerge library then can over map the new region onto an appropriate local DMO space.

Thus, from a client application perspective, a MemVerge DMO system 100 enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call.

In general, high availability is an important feature for a storage system. This aspect is particularly important in a multi-node system when nodes are removed, and a failure happens and for load balancing when nodes are added. Embodiments disclosed herein leverage PMEM in these scenarios in a data rebuild process. That is, some embodiments are a PMEM based local KV storage that utilizes a snapshot that creates a consistent point-in-time view and can be used to migrate and rebuild KV data in another available node from a replica when an original node is removed. Snapshot embodiments are described below in more detail with reference to FIGS. 5-10.

Figure 5:
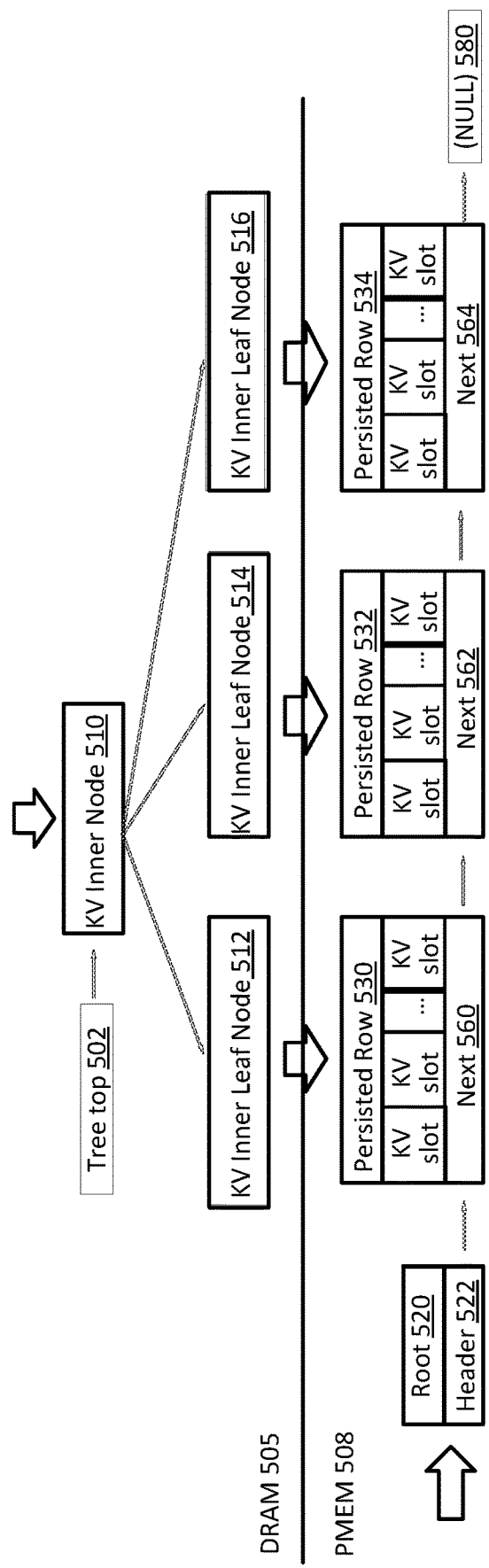
FIG. 5 is an illustration of a name service local key value store layout in a distributed computing system.

FIG. 5 is an illustration of a name service local key value store layout in a distributed computing system. In the illustrated embodiment, a snapshot function is used to create a consistent point-in-time view of the KV contents of a node. By capturing only KV contents of a node, an index-tree does not need to be captured since it can be rebuilt from the KV contents themselves. In this way, a snap can be copied to another node, the index regenerated, and a log of any updates since the snap applied to bring the copy fully up to date.

Figure 6:
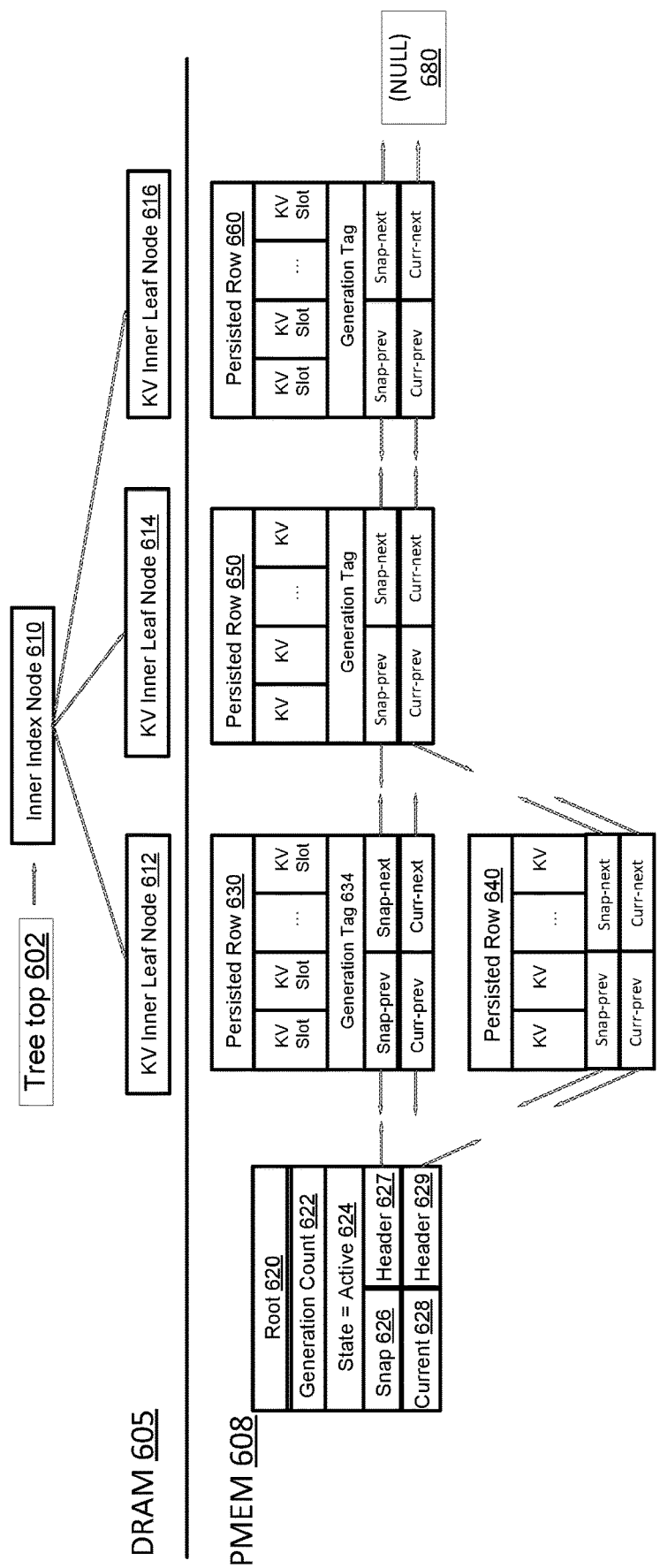
FIG. 6 is an illustration of an embodiment snaps support architecture on PMEM based key value store system.

For example, with reference to FIG. 6, a key value store snapshot method may be conducted by forming a system cluster comprising a plurality of nodes, wherein each node includes a memory, a processor and a network interface to send and receive messages and data and creating a plurality of sharable memory spaces having partitioned data, wherein each space is a distributed memory object having a compute node, wherein the sharable memory spaces are at least one of persistent memory 608 or a DRAM cache 605. Then, the method may further include storing data in persistent memory 608, the data having a generation tag 634 created from a generation counter and a doubly linked list having a current view 628 and a snapshot view 626, the data further being stored in either a root 620 or a persisted row 630. Next, the method includes creating a snapshot comprising a consistent point-in-time view of key value contents within a node and incrementing the generation counter 622, copying the snapshot to a second node 640 regenerating an index for the key value contents within the node, and logging updates since the snap was applied to update copied data in the second node. Some embodiment methods may further comprise a copy on write mechanism where new persisted rows are allocated with data copied in persistent memory when a first write to a persisted row element happens after snap creation.

Figure 7:
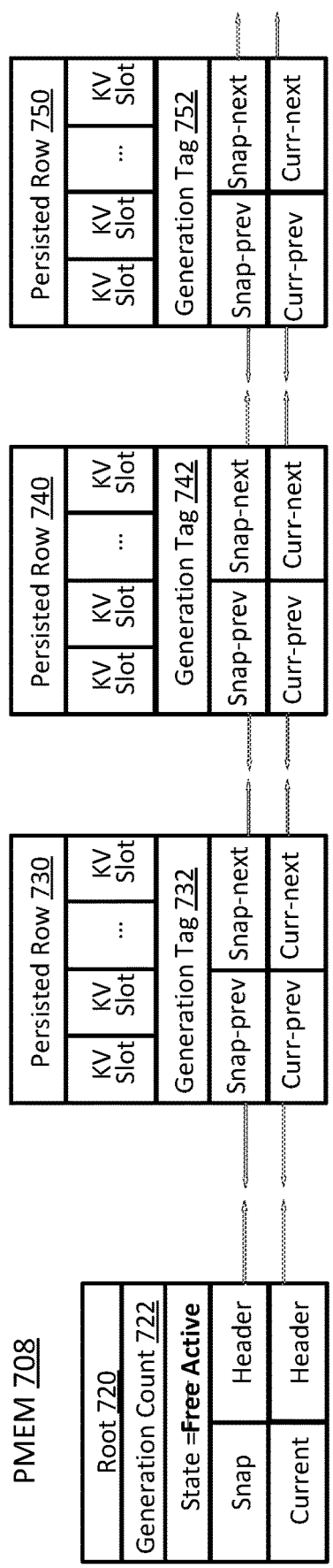
FIG. 7 is an illustration of one embodiment creating a snapshot on a key value store.

FIG. 7 is an illustration of one embodiment creating a snapshot on a key value store. In general, a process of key value store snapshot management involves detecting old data versus new data. The embodiments in FIG. 7 achieves this with use of a generation counter and tags. In this way, a point-in-time view of a key value store can be stored and referenced to determine if a key value store element was created during a current generation or if it needs to be updated. In the illustrated embodiment, a snapshot may be created by checking if the snapshot state is free as recorded in the root in persistent memory, and if so, then incrementing the generation counter and updating the snapshot state to active. Additionally, an inactive snapshot list will equal a current list.

Figure 8:
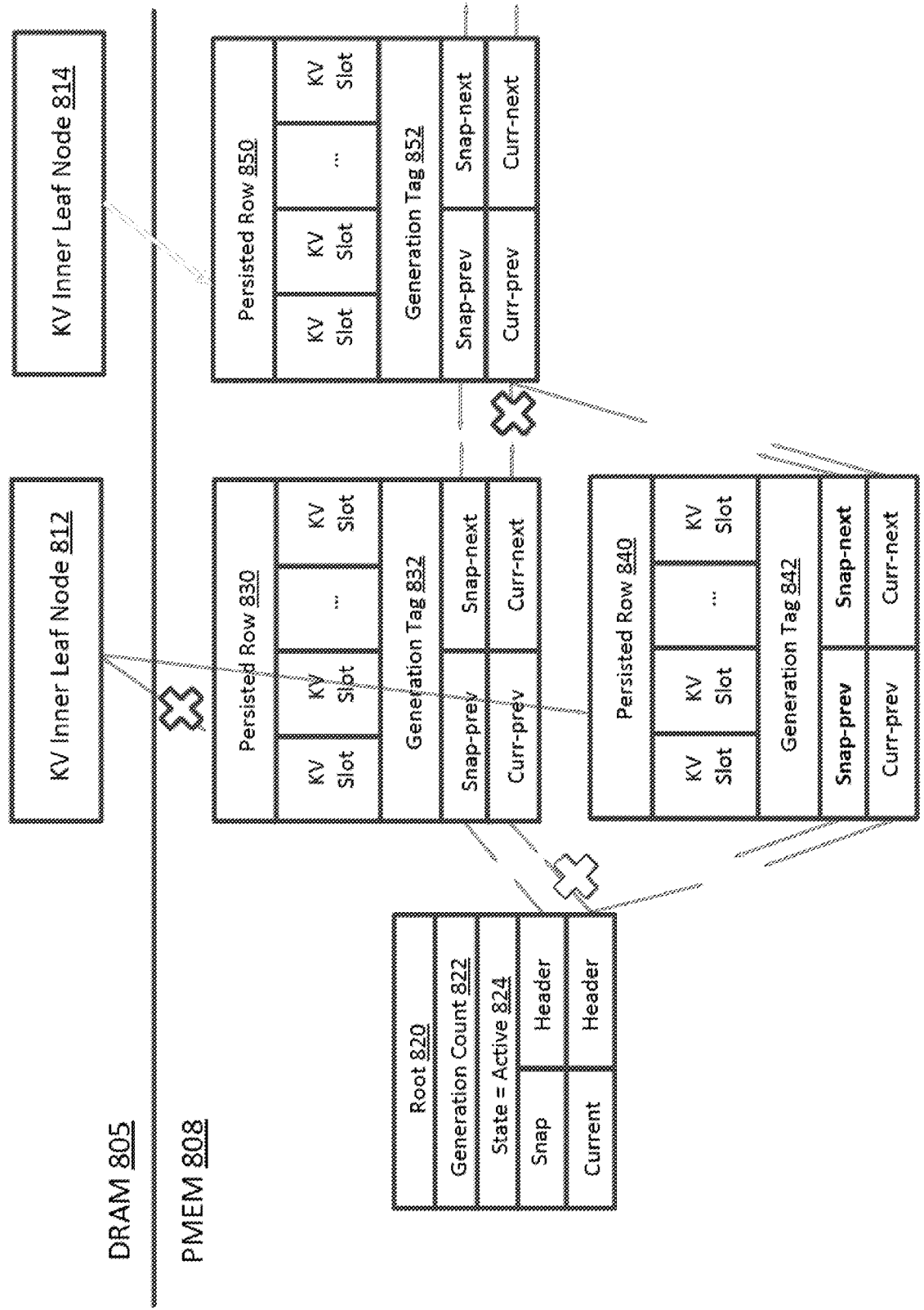
FIG. 8 is an illustration of a write key value store operation after a snap creation.

FIG. 8 is an illustration of a write key value store operation after a snap creation. For example, when a snapshot state is not active, some embodiments may modify a current list link and modify the corresponding snapshot list link to the same value. In some embodiments, to efficiently maintain inactive snapshot links equal to the current links, when snapshot 824 is not active, a current list link and a corresponding snap list link will be modified to the same value. Wherein when snapshot 824 is active, a current list link and the corresponding snap list link will be modified to the same value only when the generation tag 842 of the element which contains the link is the current generation as shown in generation count 822.

With reference to FIG. 8, when a generation tag is not equal to a generation count on a persisted row, an embodiment method may involve allocating a new persisted row 840 in persistent memory 808 and copy the data from the persisted row 830 to the new persisted row 840. Then, the new persisted row 840 can be swapped into the place of persisted row 830 in a current link list by updating an inner leaf node to point to the new persisted row and then applying a write on the new persisted row 840. With reference to FIG. 8, in new persisted row 840 the snapshot previous and snapshot next links that are shown in bold are updated as the generation tag 842 shows they are in a current generation, while corresponding links in persisted row 850 are not updated when they are in a previous generation as recorded by generation tag 852.

Figure 9:
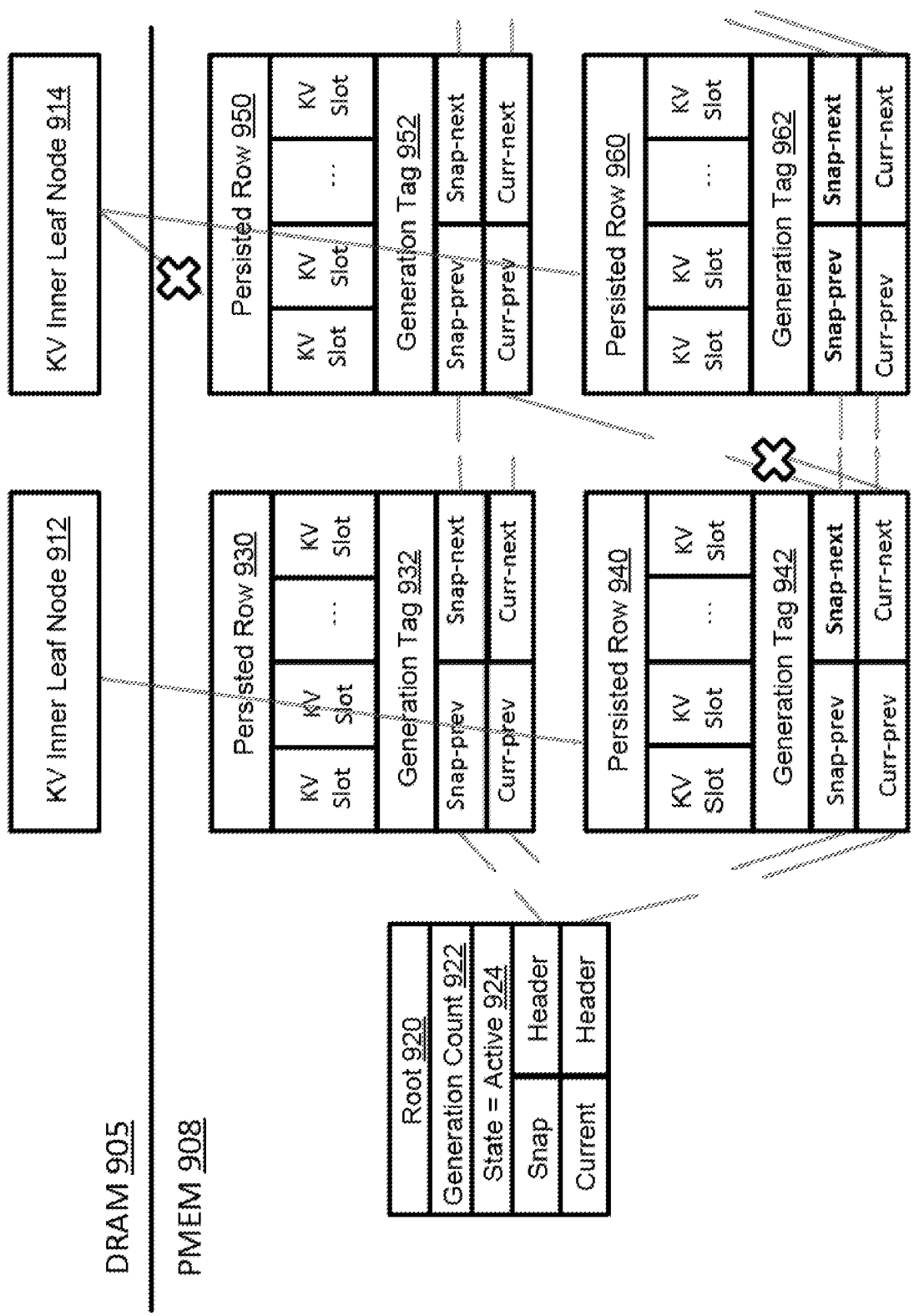
FIG. 9 is an illustration of an embodiment where a new write operation updates a snap link.

FIG. 9 is an illustration of an embodiment where a new write operation updates a snap link. For example, when a first write happens on an adjacent persisted row element 950 to a persisted row element 930, in some embodiments the snapshot link may be updated in current-generation neighbors 940 and 960 according to similar generation tags 942 and 962, wherein the snapshot next link in persistent row 940 and the snapshot previous and snapshot next links in persisted row 960 will be updated, as depicted in the illustration in bold. In this manner the embodiment in FIG. 9 saves needing to initialize/repair the snapshot list links of current generation elements during a snapshot delete operation.

Figure 10:
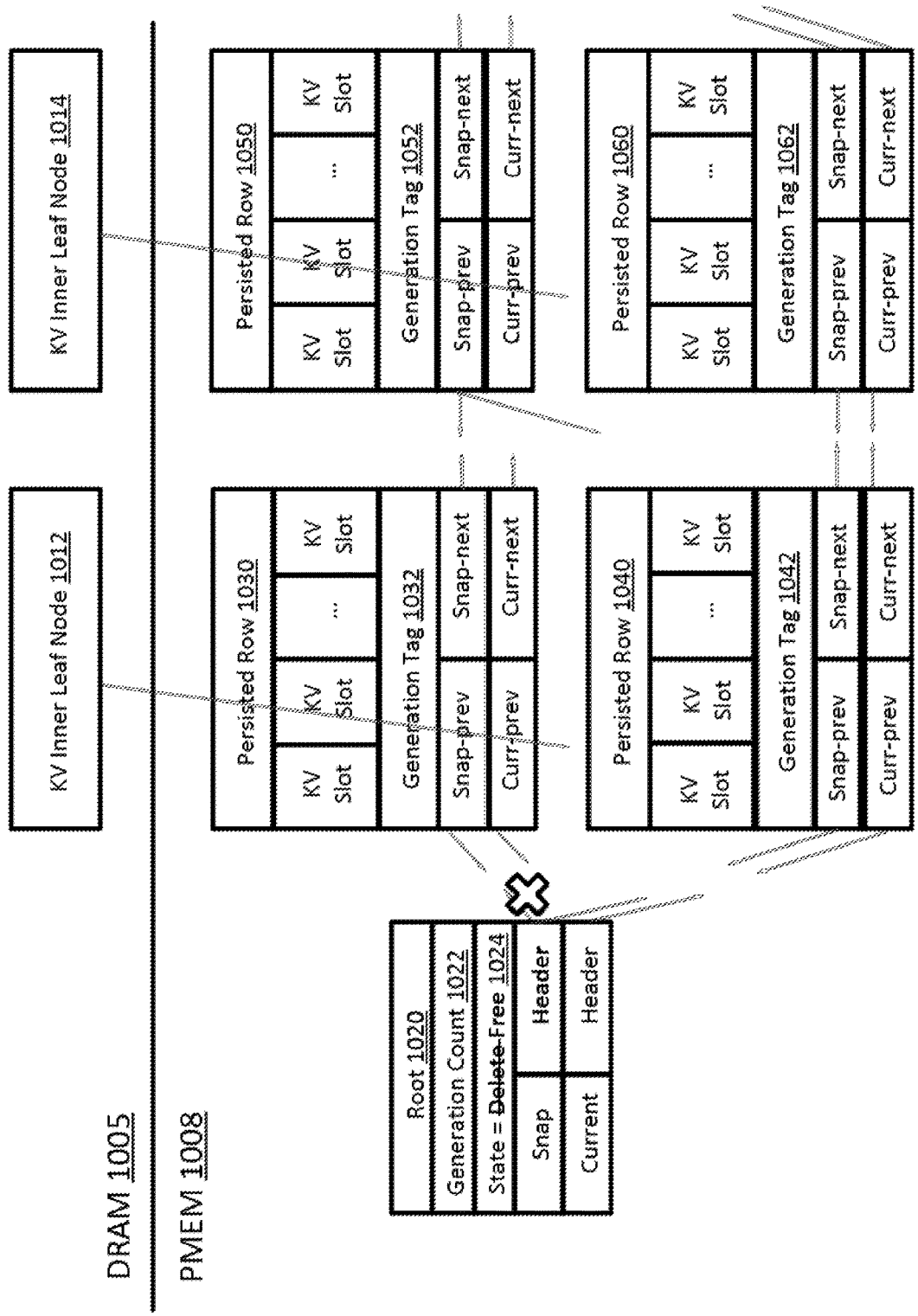
FIG. 10 is an illustration of removing a snapshot from a key value store.

FIG. 10 is an illustration of removing a snapshot from a key value store. To remove a snapshot, the snapshot state is updated to deleting and the snapshot link and current link lists are updated in PMEM and the persisted rows 1030 and 1050 are freed if they are in the snapshot list not on the current list. When the list is finished, the snapshot status 1024 can be updated to free to complete snapshot removal.

Implementation Alternatives

Figure 3:
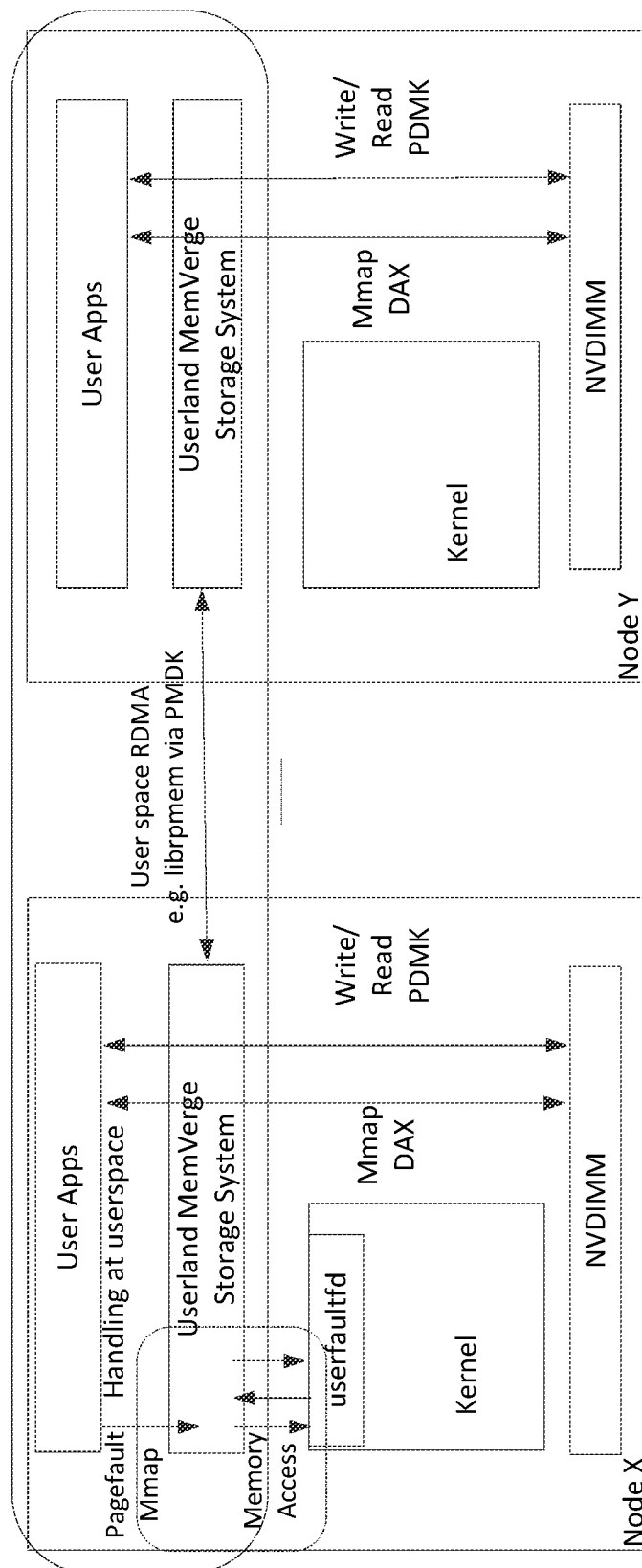
FIG. 3 is an illustration of components and processes of implementing a larger memory space across nodes by a user space approach.

To implement larger memory space than physically available on a node, some form of demand paging is necessary. Three implementation approaches are presented: user space, kernel, and hypervisor. By way of example, FIG. 3 is an illustration of components and processes of implementing a larger memory space across nodes by a user space approach. The user space approach uses the Linux userfaultfd mechanism to monitor the logical address space of the client and provide notification whenever access to a non-resident page of the object is attempted. Since a user space process cannot directly control physical memory mapping, it uses a direct access (DAX) file system to indirectly affect this.

The data for the faulting area is copied to a local file and that file is mapped into the client's address space, thus materializing the data for the page fault. This mechanism is the least intrusive to the operating environment in that it does not require a new operating system. A user space approach may provide fast development, which in turn may be beneficial to both prototype and product developments. Furthermore, a user space approach may facilitate experiments with different new technologies invented for user space apps. Additionally, a user space approach may be easy to deploy, easy to containerize, and may easily connect to other user space storage frameworks such as SPDK. However, it may utilize indirect access to memory map.

In some embodiments, a kernel space approach uses the kernel memory management to intercept page faults from the client process. As a kernel entity, the page fault handler can directly manipulate the address map. The handler can maintain a memory pool where it caches a copy of the required data, and then directly map it into the client's address space. A kernel space approach can provide a fast, efficient access to memory map; however, it also could use a custom OS and may increase scope of testing (re-verify OS).

Figure 4:
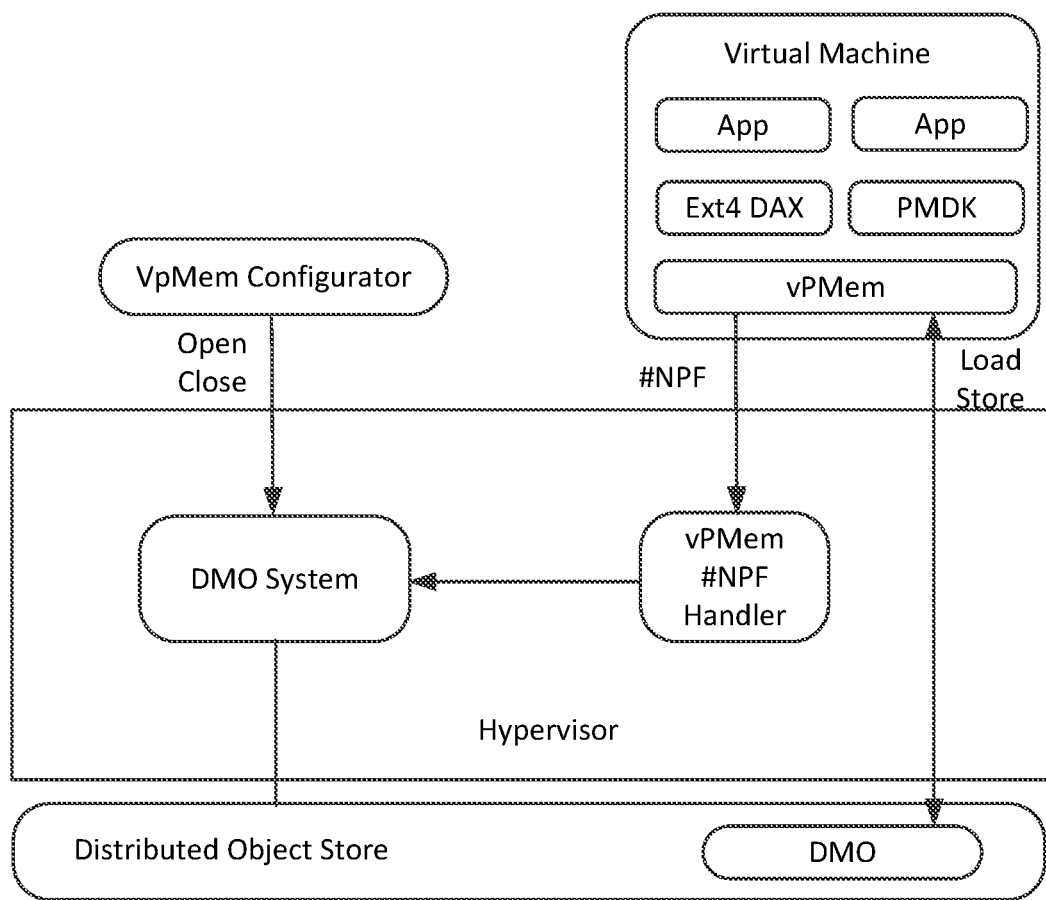
FIG. 4 is an illustration of components and processes of implementing a larger memory space across nodes by a hypervisor approach.

FIG. 4 is an illustration of components and processes of implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data. Analogous to the OS kernel, a hypervisor has direct access to its map. The page fault handler can therefore maintain a memory pool in which it caches required data, and then map that data into the host OS's address space to service a page fault. Note that the page fault can be from a user application in the host OS, or from a host OS component, etc. This approach can provide a fast, efficient access to memory map, and does not require a custom operating system.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A key value store snapshot method for a distributed memory object, the method comprising:
   forming a system cluster comprising a plurality of nodes, wherein each node includes a memory, a processor and a network interface to send and receive messages and data;
   creating a plurality of sharable memory spaces having partitioned data, wherein each space is a distributed memory object having a compute node, wherein the sharable memory spaces are at least one of persistent memory or DRAM cache;
   storing data in persistent memory, the data having a generation tag created from a generation counter and a doubly linked list having a current view and a snapshot view, the data further being stored in either a root or a persisted row;
   creating a snapshot comprising a consistent point-in-time view of key value contents within a node and incrementing the generation counter;

copying the snapshot to a second node;
regenerating an index for the key value contents within the node; and
logging updates since the snap was applied to update copied data in the second node, wherein the snapshot is created by checking if a snapshot state is free as recorded in the root, then incrementing the generation counter and updating the snapshot state to active, wherein when the generation tag is not equal to a generation count on the persisted row, the method further comprising:
allocating a new persisted row in persistent memory;
copying the data from the persisted row to the new persisted row;
swapping the new persisted row into the place of persisted row in a current link list;
updating an inner leaf node to point to the new persisted row;
applying a write on the new persisted row; and
updating a previous link and a next link of the snapshot as the generation tag in the new persisted row to depict that the previous link and the next link of the snapshot are in current generation; and
removing the snapshot from the key value store by updating the snapshot state to deleting and a snapshot link and the current link list are updated in the persistent memory and the persisted rows are freed if the persistent rows are in a snapshot list and not on the current list.

2. The key value store snapshot method of claim 1, further comprising a copy on write mechanism, where new persisted rows are allocated with data copied in the persistent memory when a first write to a persisted row element happens after snap creation.

3. The key value store snapshot method of claim 1, wherein the snapshot list equals the current list when the snapshot state is not set as active.

4. The key value store snapshot method of claim 3, wherein when the snapshot state is not active, the method further includes modifying a current list link and modifying the corresponding snapshot list link to the same value.

5. The key value store snapshot method of claim 3, wherein when the snapshot state is active, the method further includes modifying a current list link and modifying the corresponding snap list link to the same value if the generation tag of the element which contains the link is the current generation.

6. The key value store snapshot method of claim 1, wherein when a first write happens on an adjacent persisted row element, the method further comprising updating the snapshot link in current-generation neighbors.

7. A key value store snapshot system for a distributed memory object, comprising:
a system cluster comprising a plurality of nodes, wherein each node includes a memory, a processor and a network interface to send and receive messages and data, wherein the network interface operates on remote direct memory access;
a plurality of sharable memory spaces having partitioned data, wherein each space is a distributed memory object having a compute node, wherein the sharable memory spaces are at least one of persistent memory or DRAM cache, wherein data is stored in persistent memory and the data has a generation tag created from a generation counter and a doubly linked list having a current view and a snapshot view, the data further being stored in either a root or a persisted row; and
a snapshot comprising a consistent point-in-time view of key value contents within a node and incrementing the generation counter, wherein the snapshot is to be copied to a second node, and an index for the key value contents within the node is regenerated and updates are logged since the snap was applied to update copied data in the second node, wherein the snapshot is created by checking if a snapshot state is free as recorded in the root, and the generation counter is incremented and the snapshot state is updated to active, wherein when the generation tag is not equal to a generation count on the persisted row, the system further includes a new persisted row being allocated in persistent memory, wherein the data from the persisted row is copied to the new persisted row and the new persisted row is swapped into the place of persisted row in a current link list and an inner leaf node is updated to point to the new persisted row and a write is applied on the new persisted row, and a previous link and a next link of the snapshot is updated as the generation tag in the new persisted row to depict that the previous link and the next link of the snapshot are in current generation; and the snapshot is removed from the key value store by updating the snapshot state to deleting and a snapshot link and the current link list are updated in the persistent memory and the persisted rows are freed if the persisted rows are in a snapshot list and not on the current list.

8. The key value store snapshot system of claim 7, further comprising a copy on write mechanism, where new persisted rows are be allocated with data copied in the persistent memory when a first write to a persisted row element happens after snap creation.

9. The key value store snapshot system of claim 7, wherein the snapshot list equals the current list when the snapshot state is not set as active.

10. The key value store snapshot system of claim 9, wherein when the snapshot state is not active, a current list link and a corresponding snapshot list link are modified to the same value.

11. The key value store snapshot system of claim 9, wherein when the snapshot state is active, the system further includes a current list link and the corresponding snap list link are modified to the same value if the generation tag of the element which contains the link is the current generation.

12. The key value store snapshot system of claim 7, wherein when a first write happens on an adjacent persisted row element, the snapshot link in current-generation neighbors is updated.

* * * * *